(12) United States Patent  (10) Patent No.: US 10,561,117 B2
Amicarelli  (45) Date of Patent: Feb. 18, 2020

(54) ELEVATED ANIMAL WASTE REPOSITORY

(71) Applicant: Ellen Beth Amicarelli, Warwick, RI (US)

(72) Inventor: Ellen Beth Amicarelli, Warwick, RI (US)

(*) Notice: Subject to any disclaimer, the term of this patent is extended or adjusted under 35 U.S.C. 154(b) by 0 days.

(21) Appl. No.: 16/297,092

(22) Filed: Mar. 8, 2019

(65) Prior Publication Data

US 2019/0200567 A1 Jul. 4, 2019

Related U.S. Application Data

(63) Continuation-in-part of application No. 15/349,111, filed on Nov. 11, 2016, now Pat. No. 10,357,018.

(60) Provisional application No. 62/333,725, filed on May 9, 2016.

(51) Int. Cl.
| | | |
|---|---|---|
| *A01K 1/00* | (2006.01) | |
| *A01K 1/01* | (2006.01) | |
| *F16M 11/42* | (2006.01) | |
| *F16M 11/32* | (2006.01) | |
| *A01K 1/035* | (2006.01) | |

(52) U.S. Cl.
CPC ............ *A01K 1/0107* (2013.01); *A01K 1/035* (2013.01); *F16M 11/32* (2013.01); *F16M 11/42* (2013.01)

(58) Field of Classification Search
CPC ........... A01K 1/00; A01K 1/0035; A01K 1/03
USPC ......................................... 119/161, 165-169
See application file for complete search history.

(56) References Cited

U.S. PATENT DOCUMENTS

| | | | | |
|---|---|---|---|---|
| 5,394,835 | A * | 3/1995 | Gatta | A01K 1/0107 |
| | | | | 119/165 |
| 6,431,119 | B1 * | 8/2002 | Beymer | A01K 1/033 |
| | | | | 119/485 |
| 6,862,757 | B2 * | 3/2005 | Andriunas | A47D 7/04 |
| | | | | 5/93.2 |
| 7,681,524 | B1 * | 3/2010 | Hudson | A01K 1/0107 |
| | | | | 119/28.5 |
| D685,147 | S * | 6/2013 | Muir | D30/118 |
| 9,185,879 | B2 * | 11/2015 | Bellini | A01K 1/0114 |
| 9,635,833 | B2 * | 5/2017 | Oeltjen | A01K 1/034 |
| 9,750,227 | B2 * | 9/2017 | Womble | A01K 1/033 |
| 9,826,711 | B1 * | 11/2017 | Evans | A01K 1/0245 |
| 9,854,782 | B2 * | 1/2018 | Sogou | A01K 1/0107 |
| 9,936,680 | B2 * | 4/2018 | Womble | A01K 27/009 |
| 10,178,851 | B2 * | 1/2019 | Amicarelli | A01K 1/0107 |

* cited by examiner

*Primary Examiner* — Richard T Price, Jr.

(57) ABSTRACT

An elevated animal waste repository comprising a frame. The frame includes an upper structure with a drop step mounted and offset by a lower structure coupled to the upper structure. A flat staging area is coupled to the upper structure for litter box placement. A plurality of legs extends downward from the frame members forming an elevated litter box platform with a step entry for the cat to access the litter box and high enough off the ground to only have to bend slightly at the person's waist to access the litter box area.

8 Claims, 7 Drawing Sheets

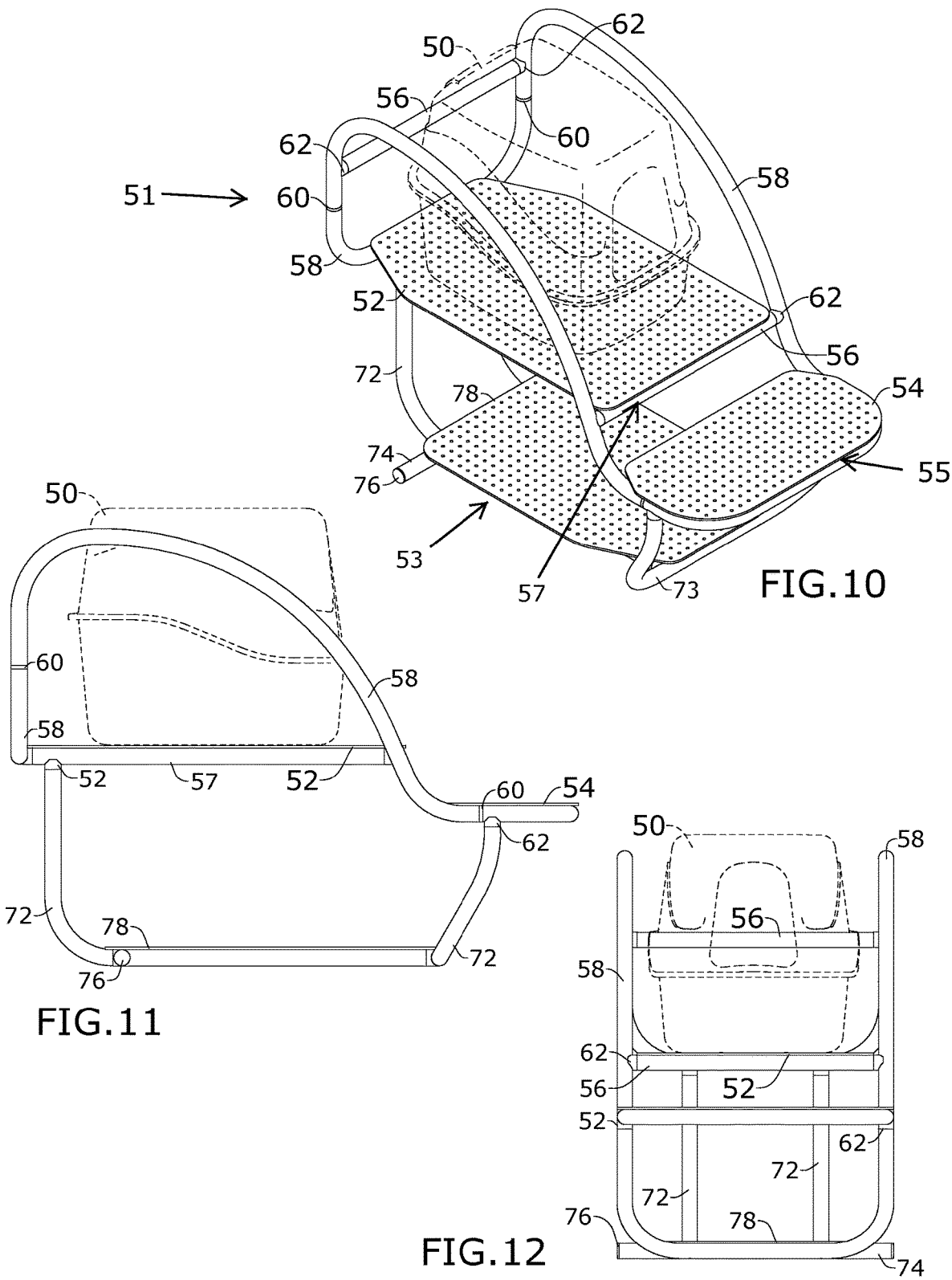

ELEVATED ANIMAL WASTE REPOSITORY

CROSS-REFERENCE TO RELATED APPLICATION

This application is a continuation in part of U.S. nonprovisional application Ser. No. 15/349,111, filed Nov. 11, 2016 which claims the benefit of priority of U.S. provisional application No. 62/333,725, filed May 9, 2016, the contents of which are herein incorporated by reference.

BACKGROUND OF THE INVENTION

The present invention relates to a litter box and, more particularly, to an elevated litter box.

A litter box is an indoor feces and urine collection box for animals, such as cats, that are permitted free roam of a home but who cannot or do not always go outside to relieve themselves. Many owners of these animals prefer not to let them roam outside for fear that they might succumb to outdoor dangers, such as weather, wildlife or traffic. A litter box makes it possible to shelter pets from these risks.

Currently, litter boxes are placed on the ground and the pet owner must bend down to the litter box to clean it and care for it. This is very problematic for pet owners that have back or knee problems or are disabled and limited in mobility. Further, the litter box creates obstacles for children playing on the ground and allows other animals to access the inside of the litter box, which may cause messes.

As can be seen, there is a need for a device that allows disabled individuals to clean a litter box without having to bend over.

SUMMARY OF THE INVENTION

In one aspect of the present invention, an elevated animal waste repository comprises:

These and other features, aspects and advantages of the present invention will become better understood with reference to the following drawings, description and claims.

BRIEF DESCRIPTION OF THE DRAWINGS

FIG. 10 is a perspective view of an embodiment of the present invention;

FIG. 11 is a side view of an embodiment of the present invention; and

FIG. 12 is a front view of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a cat litter box stand that supports a litter box at the waist height of the pet owner. The present invention elevates the cat litter box up off the ground to the level/height of the pet owner's waist and eliminates the need for the pet owner to bend down to the ground to clean and care for the litter box. Further, the present invention removes the litter box from the floor which prevents children from accessing the inside of the litter box.

Figure 1:
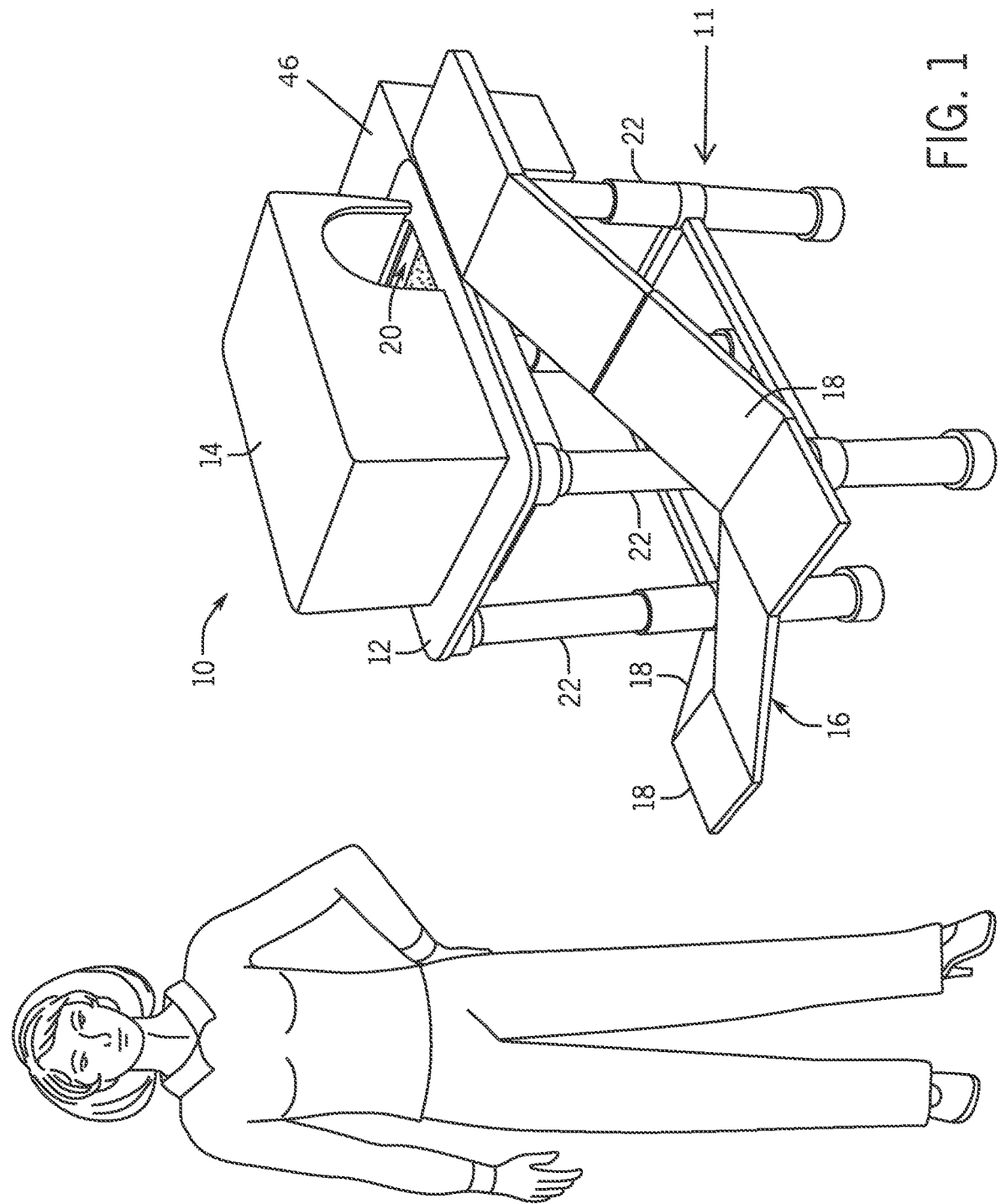
FIG. 1 is a perspective view of an embodiment of the present invention illustrating a waist height of the litter box.
Figure 2:
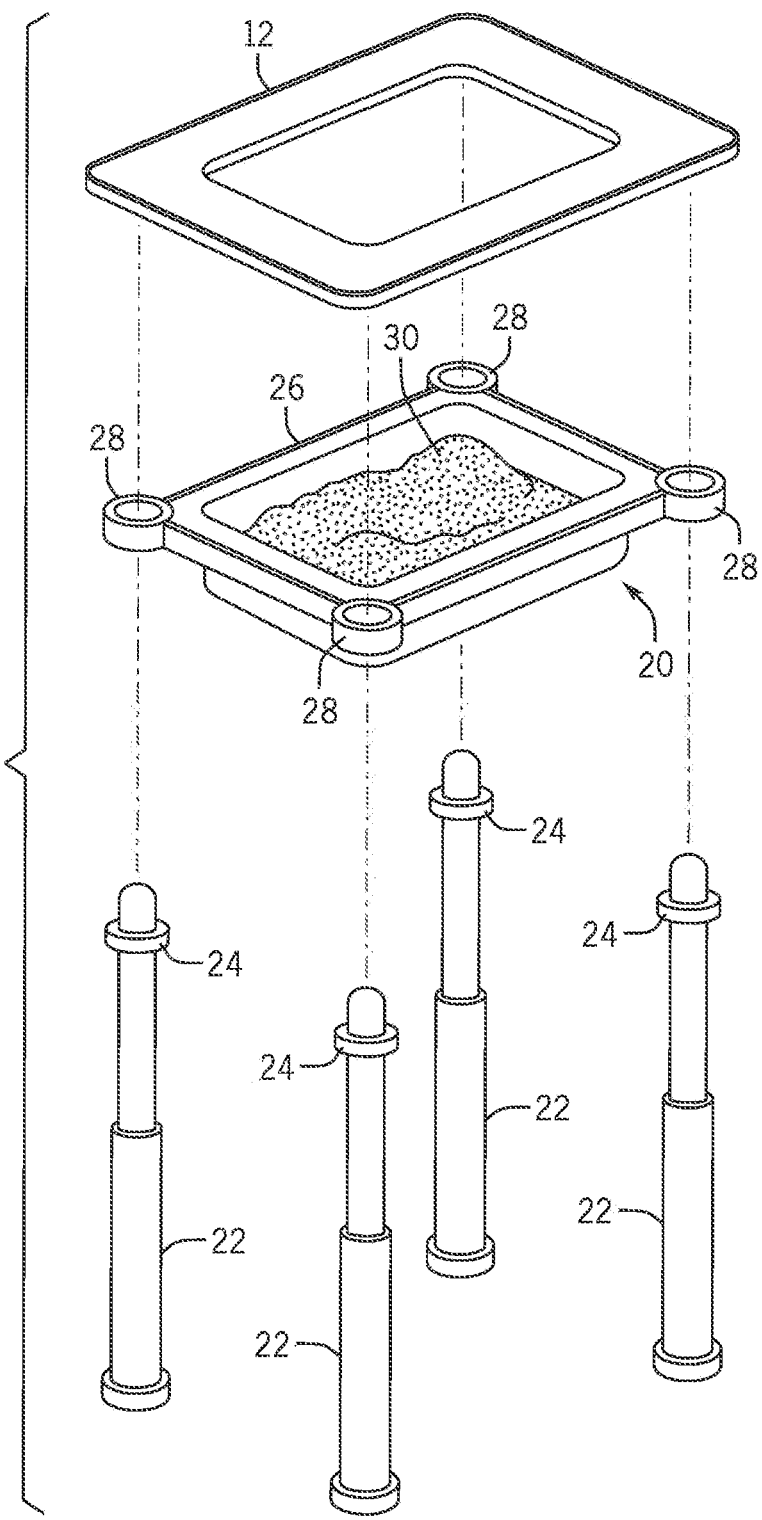
FIG. 2 is an exploded view of an embodiment of the present invention.
Figure 3:
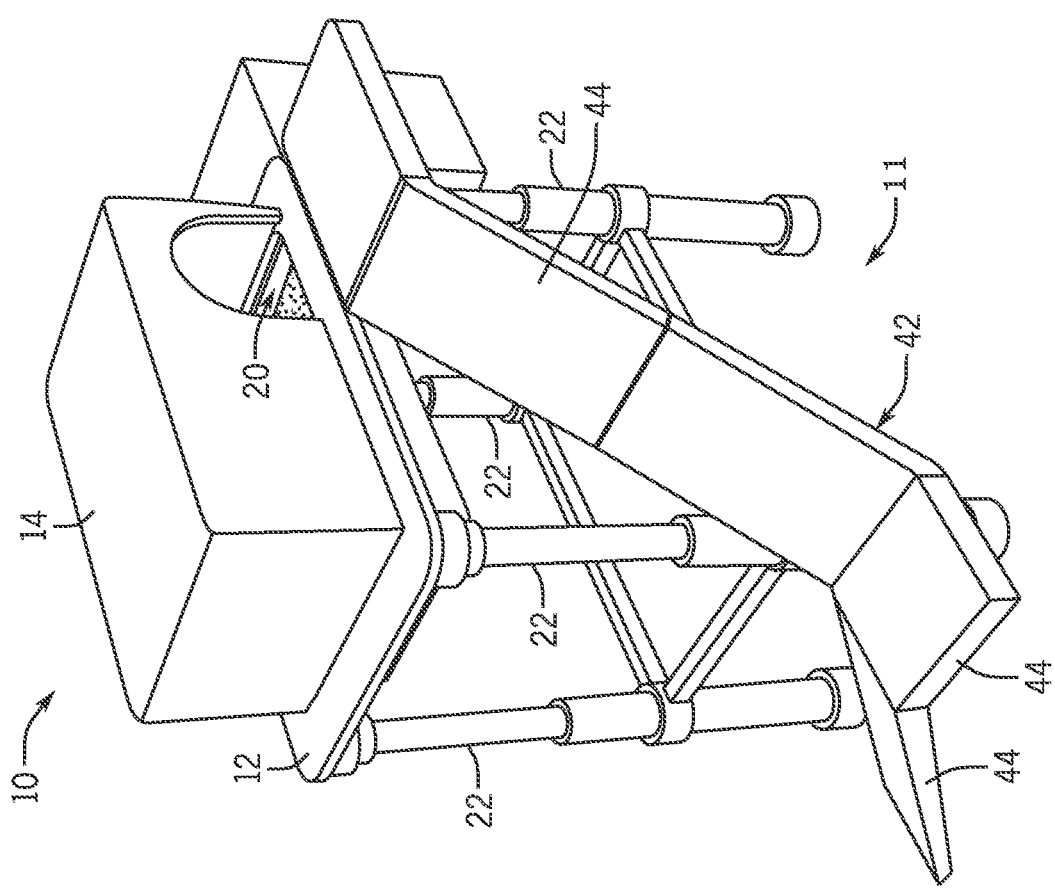
FIG. 3 is a perspective view of an alternate ramp of an embodiment of the present invention.
Figure 4:
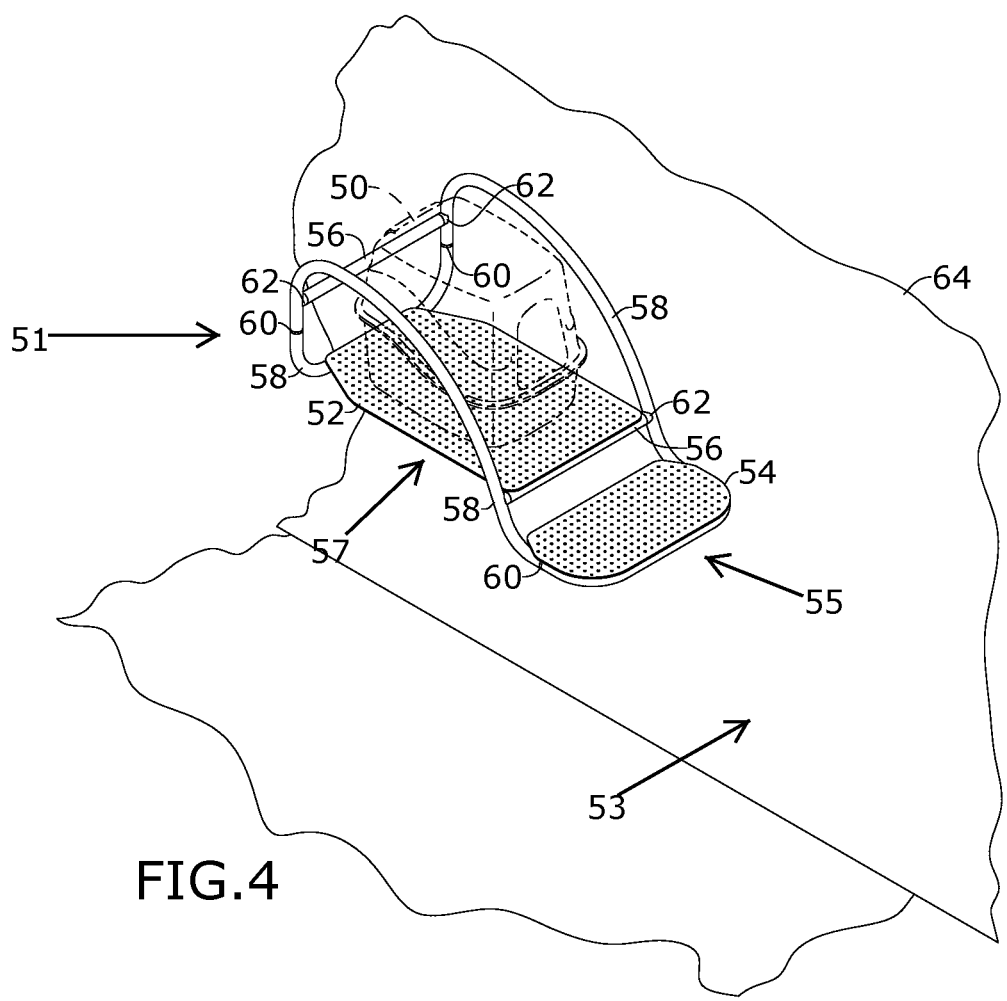
FIG. 4 is a perspective view of an embodiment of the present invention.
Figure 5:
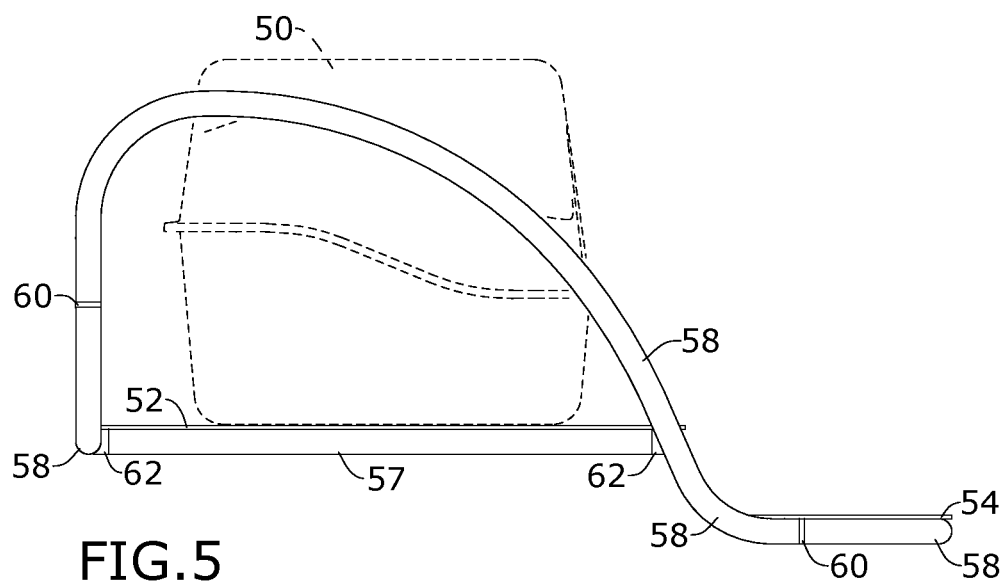
FIG. 5 is a side view of an embodiment of the present invention.
Figure 6:
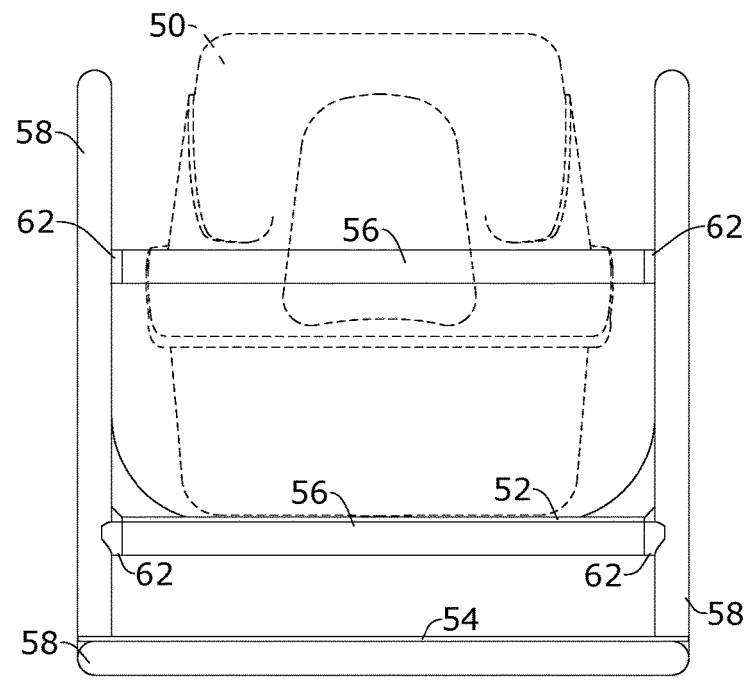
FIG. 6 is a front view of an embodiment of the present invention.

Referring to FIGS. 1 through 3, the present invention includes an elevated animal waste repository 10. The repository 10 includes a litter box 20, a base 11 and a ramp 16. The litter box 20 includes a bottom wall and a sidewall extending from the bottom wall. The sidewall may include an upper rim 26 that forms an opening into the litter box 20. A plate 12 may rest against the upper rim. The plate 12 may also include an opening that aligns with the opening of the upper rim 26. The base 11 includes a bottom end and a top end. The litter box 20 is secured to the top end of the base 11. The base 11 supports the litter box 20 in an elevated position when resting on a surface. The elevated position may be waist high level of an individual. The ramp 16 runs from the bottom end of the base to the upper rim 12 of the litter box 20, allowing a cat to access the inside of the litter box 20.

In certain embodiments, the base 11 includes a plurality of legs 22. The plurality of legs 22 may be adjustable in length. For example, each of the plurality of legs 22 may include telescoping tubes. Therefore, the height of elevation of the litter box 20 may be adjusted to be at the waist height of different sized individuals. The telescoping tubes may be locked in place by aligning apertures and locking pegs running through the aligned apertures. Alternatively, the telescoping tubes may be locked in place cams, clips and the like.

In certain embodiments, the litter box 20 may removably attached to the base, and thereby easily separated from the base 11. Therefore, a user may easily remove the litter box 20 and empty out the dirty litter 30. In such embodiments, the top ends of the plurality of legs may include a peg and a flange 24. Each corner of the litter box 20 may include slots 28. The slots 28 fit over the peg and rest on the flange 24. To separate the litter box 20 from the base 11, the user may lift the litter box 20 and thereby lift the slots 28 from the pegs.

The present invention may further include a removable cover 14. The cover 14 may include a top wall and a sidewall extending from the top wall. The sidewall may include a bottom rim forming an opening. The bottom rim may rest against the plate 12 of the litter box 20. In certain embodiments, the sidewall of the cover 14 may include a cutout portion forming an entrance into the litter box 20. The cutout portion may be adjacent to a top end of the ramp 16.

As illustrated in FIG. 1, the ramp 16 may be formed of a plurality of panels 18 pivotally secured together. To secure the ramp 16 to the repository 10, the panels 18 are folded away from one another and attached to the base 11. The ramp 16 may wrap around a first side, a second side and a third side of the base 11 so that the angle of the ramp is low enough to permit the cat to walk up the ramp 16 with ease. As illustrated in FIG. 3, the ramp 42 of the present invention may include a plurality of panels 44 that only wrap around a first side and a second side, which increases the angle of the panels 44.

The present invention may include additional components. For example, the present invention may include a dirty litter receptacle 46. The dirty litter receptacle 46 may be attached to a side of the litter box 20 allowing users to easily scoop dirty litter and place the dirty litter within the dirty litter receptacle 46. A plastic bag may be placed within the dirty litter receptacle 46, so that users may easily transfer the dirty litter 30 to the trash. The present invention may further include handles extending from the sides of the litter box 26 and from the cover 14, allowing users to easily remove the litter box 26 and the cover 14 from the base 11.

In certain embodiments, the legs 22, the litter box 26 and cover 14 are made of plastic, rubber or the like. The climbing ramp 16 may be made of plastic or wood and may include a gripping material, such as a fabric or rubber material.

Referring to FIGS. 4 through 12, the present invention includes an elevated animal waste repository including a frame 51. The frame 51 includes an upper frame member 57 coupled to a lower frame member 55. The lower frame member 55 is disposed beneath and offset from the upper frame member 57. A litter box platform 52 is coupled to the upper frame member 57. A litter box 50 is disposed on the upper frame member 57. A step platform 54 is coupled to the lower frame member 55. The frame 51 is affixed to a support 53 that elevates the litter box platform 52 to approximately waist height of an average human.

The frame 51 is made of a plurality of tubing coupled together by pipe connectors 60 and connecting brackets 62. The plurality of tubing includes cross members 56 defining the upper frame member 57 and the lower frame member 55, and side members 58 connecting the cross members 56 together. The side members 58 and a back member (one of the cross members 56) may be elevated above the litter box platform 52 and disposed around the sides and the back of the litter box 70, keeping the litter box 70 contained on top of the litter box platform 72. The step platform 54 may be disposed in front of and beneath the litter box platform 52 so that a cat may hop onto the step platform 54 and into the litter box 50.

In certain embodiments, the support 53 is a wall 64 of a dwelling structure. In such embodiments, a side of the frame 51 may coupled directly to the wall 64 by screws, anchors, and the like. The frame 51 may be coupled to the wall 64 at about waist level so that a user may pick up the litter box 50 without having to bend over.

Figure 7:
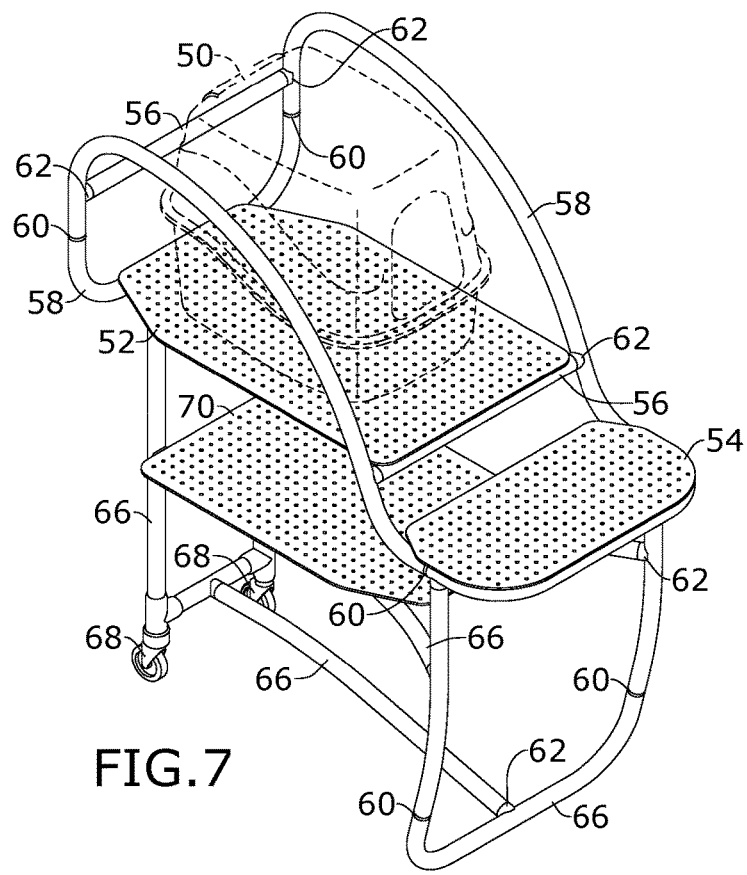
FIG. 7 is a perspective view of an embodiment of the present invention.
Figure 8:
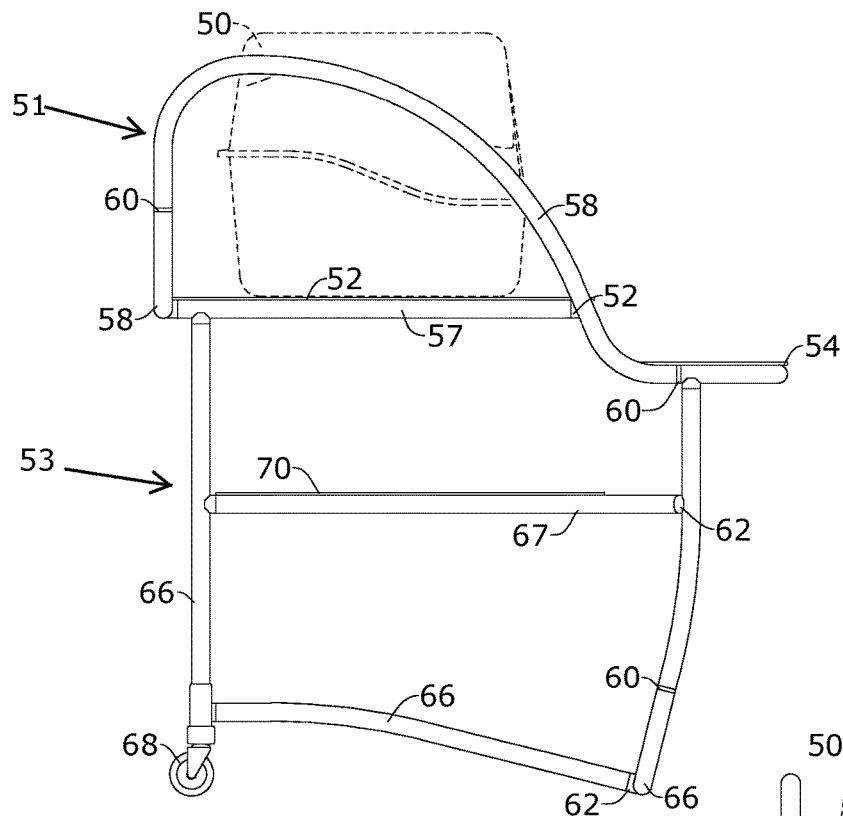
FIG. 8 is a side view of an embodiment of the present invention.
Figure 9:
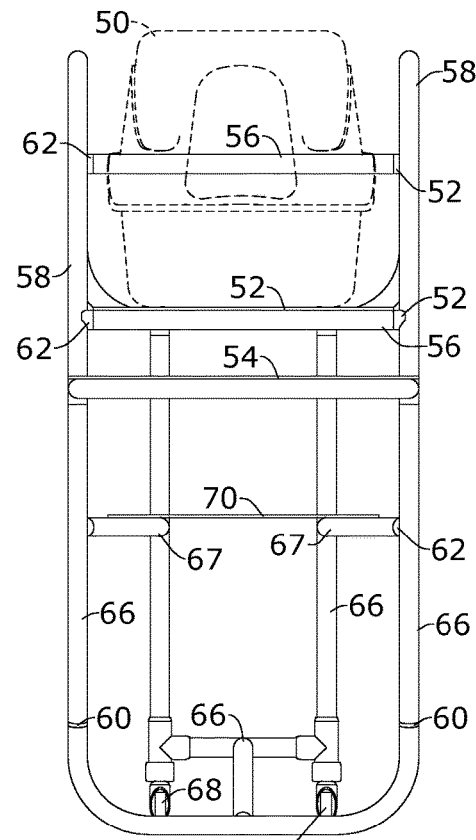
FIG. 9 is a front view of an embodiment of the present invention.

As illustrated in FIGS. 7 through 9, the support structure 53 includes a plurality of legs 66 extending downward from the frame 51. A bottom frame member 67 is coupled to the plurality of legs 66 and a lower shelf platform 70 is coupled to the bottom frame member 67. The lower shelf platform 70 may be used to store cat litter or other supplies. Additionally, casters 68 may be coupled to at least two of the plurality of legs 66, such as two back legs 66. Therefore, a user may transport the elevated animal waste repository by tilting and rolling the frame 51.

As illustrated in FIGS. 10 through 12, the support structure 53 may include a plurality of legs 72 coupled to a bottom frame member 73 and a lower shelf platform 78 is coupled to the bottom frame member 73, similar to FIGS. 7 through 9. However, cross supports 74 may be coupled directly to the bottom frame member 73 with end caps 76. The cross supports 74 support the frame 51 in an upright position when resting on a surface.

It should be understood, of course, that the foregoing relates to exemplary embodiments of the invention and that modifications may be made without departing from the spirit and scope of the invention as set forth in the following claims.

What is claimed is:

1. An elevated animal waste repository comprising:
A frame formed by an upper structure, coupled to a lower structure, wherein the lower structure is set beneath and offset from the upper structure;
an upper structure with a drop step mounted and offset by a lower structure coupled to the upper structure;
A flat staging area coupled to the upper structure;
a litter box rests on top of the flat staging area of the upper structure;
Upper structure with a drop step mounted and offset by the lower structure is affixed to a support that elevates the litter box staging area off the ground and allowing cat entry to litter box by way of drop step.

2. The elevated animal waste repository of claim 1, wherein the upper structure comprises side securing features and a back securing feature surrounding the flat staging area of the litter box.

3. The elevated animal waste repository of claim 1, wherein the support comprises a wall of a dwelling structure.

4. The elevated animal waste repository of claim 1, wherein the support comprises a plurality of legs extending downward from the upper and lower structures.

5. The elevated animal waste repository of claim 4, further comprising casters coupled to at least two of the plurality of legs.

6. The elevated animal waste repository of claim 1, further comprising a bottom frame member coupled to the plurality of legs, adding height, and a lower platform coupled to the bottom frame member that can be used for storage.

7. The elevated animal waste repository of claim 1, wherein both upper and lower frame structure members are made of a plurality of tubing coupled together by pipe connectors and connecting brackets.

8. The elevated animal waste repository of claim 1, wherein the plurality of tubing comprises cross members defining the upper frame members and the lower frame member, and side members connecting the cross members together.

* * * * *